(12) United States Patent
Klitsner et al.

(10) Patent No.: US 6,209,845 B1
(45) Date of Patent: *Apr. 3, 2001

(54) KEYBOARD INTERFACE

(75) Inventors: Dan Klitsner, Larkspur; Brian Clemens; Michael Liebowitz, both of San Francisco; Jeff Argentine, Berkeley, all of CA (US)

(73) Assignee: Klitsner Industrial Design, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,649

(22) Filed: Oct. 12, 1999

Related U.S. Application Data

(63) Continuation of application No. 09/019,489, filed on Feb. 4, 1998, now Pat. No. 5,992,819.

(51) Int. Cl.⁷ .................... H01H 3/20; A47G 29/00
(52) U.S. Cl. ............. 248/694; 248/918; 200/300; 345/156
(58) Field of Search ................... 248/694, 918, 248/205.2, 500, 505, 510, 680, 506, 459, 690, 205.1, 692; 200/3.3, 332.1, 4; 24/17 A, 16 R, 17 R, 68 F, 17 AP, 17 B; 345/156; 463/37

(56) References Cited

U.S. PATENT DOCUMENTS

| | | | |
|---|---|---|---|
| 2,896,889 | * 7/1959 | Hershberger et al. | 248/71 |
| 3,317,019 | 5/1967 | Braune | 197/98 |
| 3,805,939 | 4/1974 | Ross | 197/19 |
| 3,825,101 | 7/1974 | Wineman | 400/473 |
| 3,964,594 | 6/1976 | Gabbrielli et al. | 197/98 |
| 4,012,127 | 3/1977 | Bolander | 350/243 |
| 4,020,328 | 4/1977 | Bradam | 235/146 |
| 4,030,094 | 6/1977 | Anderson | 340/365 R |
| 4,075,465 | 2/1978 | Funk et al. | 235/145 R |
| 4,100,402 | 7/1978 | Lundström et al. | 235/145 R |
| 4,124,313 | 11/1978 | Schmidt et al. | 400/491.2 |
| 4,158,130 | 6/1979 | Speraw et al. | 235/146 |
| 4,199,839 | 4/1980 | Martinec | 15/354 |

(List continued on next page.)

FOREIGN PATENT DOCUMENTS

| | | | |
|---|---|---|---|
| 196 06 467 A1 | 8/1997 | (DE) | G06F/3/02 |
| 0 591 560 A1 | 4/1994 | (EP) . | |
| 0 810 543 A1 | 12/1997 | (EP) . | |
| WO 89/01356 | 2/1989 | (WO) . | |

OTHER PUBLICATIONS

European Search Report, Jun. 15, 1999.
European Search Report, Jun. 18, 1999.
International Search Report, Jun. 2, 1999.
Advertising Brochure, "Piano Discovery", by Jump Software, Inc., 1997.

*Primary Examiner*—Anita M. King
(74) *Attorney, Agent, or Firm*—Fish & Richardson P.C.

(57) ABSTRACT

A keyboard has a key array including keys, a top surface having a front edge and a back edge, and a bottom surface positioned opposite the top surface. An interface device for use with the keyboard includes a base, a front standoff coupled to the base and having a keyboard-contacting portion, and a back standoff coupled to the base and having a keyboard-contacting portion. The keyboard-contacting portions are spaced such that, when the base is positioned over the key array, the key array is positioned between the keyboard-contacting portions so as to align the base in a front-to-back orientation relative to the key array. The keyboard-contacting portions are both supported by the top surface of the keyboard. The interface device also includes a key-contacting mechanism mounted on the base in a fixed orientation relative to the standoffs, and a coupling mechanism for removably coupling the interface device to the keyboard.

12 Claims, 13 Drawing Sheets

U.S. PATENT DOCUMENTS

| | | | |
|---|---|---|---|
| 4,536,160 | 8/1985 | Hatfield | 434/227 |
| 4,540,176 | 9/1985 | Baer | 463/37 |
| 4,575,591 | 3/1986 | Lugaresi | 200/6 A |
| 4,595,804 | 6/1986 | MacConnell | 200/5 A |
| 4,729,563 | 3/1988 | Yokoi | 463/31 |
| 4,786,768 | 11/1988 | Langewis et al. | 200/6 A |
| 4,825,019 | 4/1989 | Fisher | 200/6 A |
| 4,945,357 | 7/1990 | Tal | 341/20 |
| 5,034,574 | 7/1991 | Martovitz | 200/6 A |
| 5,089,690 | 2/1992 | Okamura | 235/145 R |
| 5,092,459 | 3/1992 | Uljanic et al. | 206/320 |
| 5,096,317 | 3/1992 | Phillippe | 400/714 |
| 5,131,620 * | 7/1992 | Boundy | 248/674 |
| 5,193,924 | 3/1993 | Larson | 400/472 |
| 5,204,511 | 4/1993 | Baitz et al. | 235/145 R |
| 5,214,429 | 5/1993 | Greenberger | 341/22 |
| 5,260,869 | 11/1993 | Ferrier et al. | 600/595 |
| 5,296,845 | 3/1994 | Haller | 463/9 |
| 5,343,249 | 8/1994 | DuBosque, Jr. | 345/160 |
| 5,413,294 | 5/1995 | Greenquist | 248/127 |
| 5,420,607 | 5/1995 | Miller et al. | 345/156 |
| 5,452,960 | 9/1995 | Kuhlenschmidt | 400/487 |
| 5,514,855 | 5/1996 | Sullivan | 235/145 R |
| 5,556,339 | 9/1996 | Cohen | 463/1 |
| 5,583,496 | 12/1996 | Sharpe, III et al. | 341/22 |
| 5,600,313 | 2/1997 | Freedman | 341/22 |
| 5,603,658 | 2/1997 | Cohen | 463/1 |
| 5,640,179 * | 6/1997 | Lake | 345/161 |
| 5,647,796 | 7/1997 | Cohen | 463/1 |
| 5,667,319 | 9/1997 | Satloff | 400/472 |
| 5,717,423 | 2/1998 | Parker | 345/108 |
| 5,725,189 * | 3/1998 | Landy | 248/205.2 |
| 5,746,604 | 5/1998 | Cohen | 434/307 R |
| 5,751,273 | 5/1998 | Cohen | 345/156 |
| 5,781,406 | 7/1998 | Hunte | 361/686 |
| 5,805,138 | 9/1998 | Brawne et al. | 345/156 |
| 5,818,420 | 10/1998 | Mitusmine et al. | 345/156 |
| 5,967,898 | 10/1999 | Takasaka et al. | 463/37 |

* cited by examiner

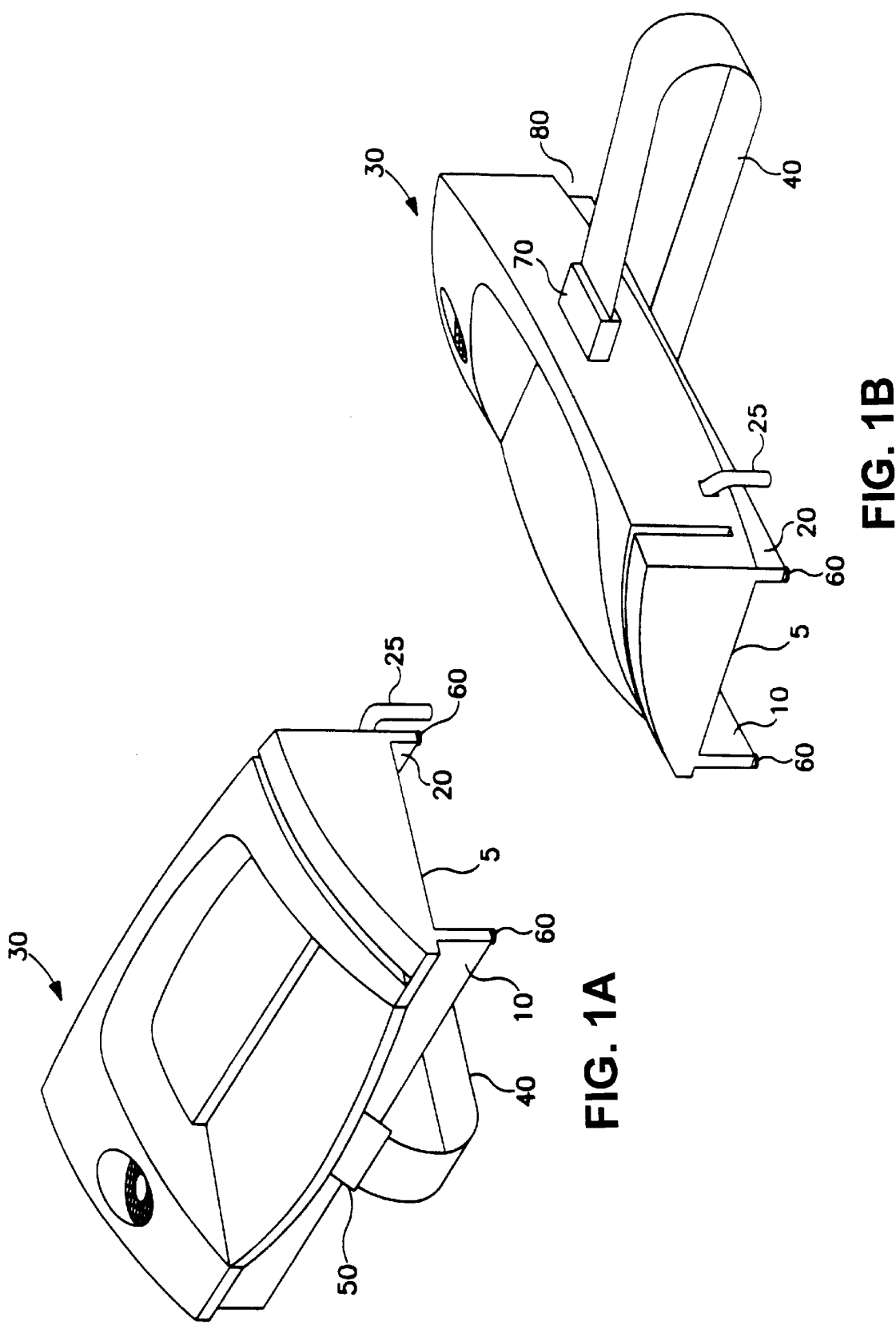

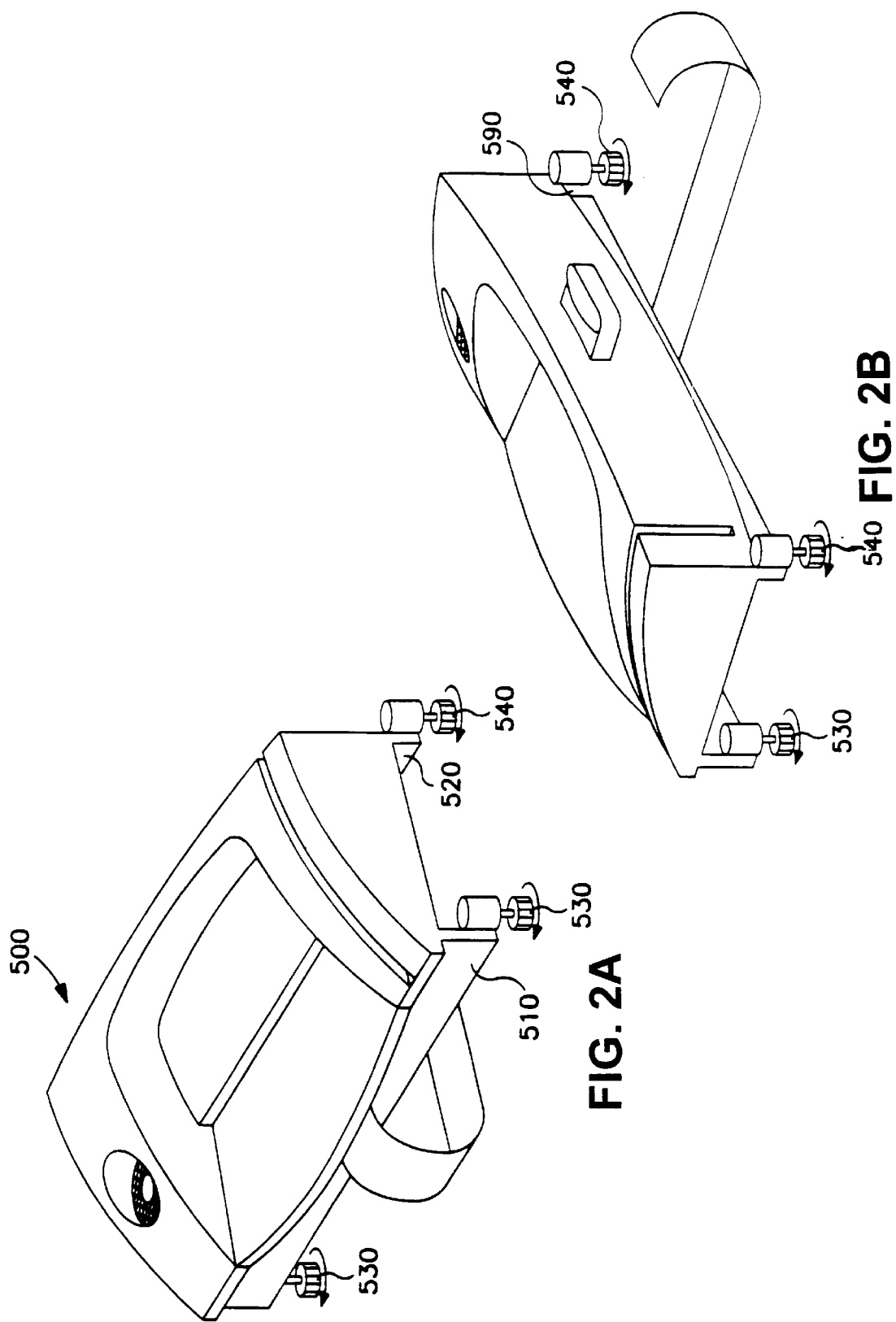

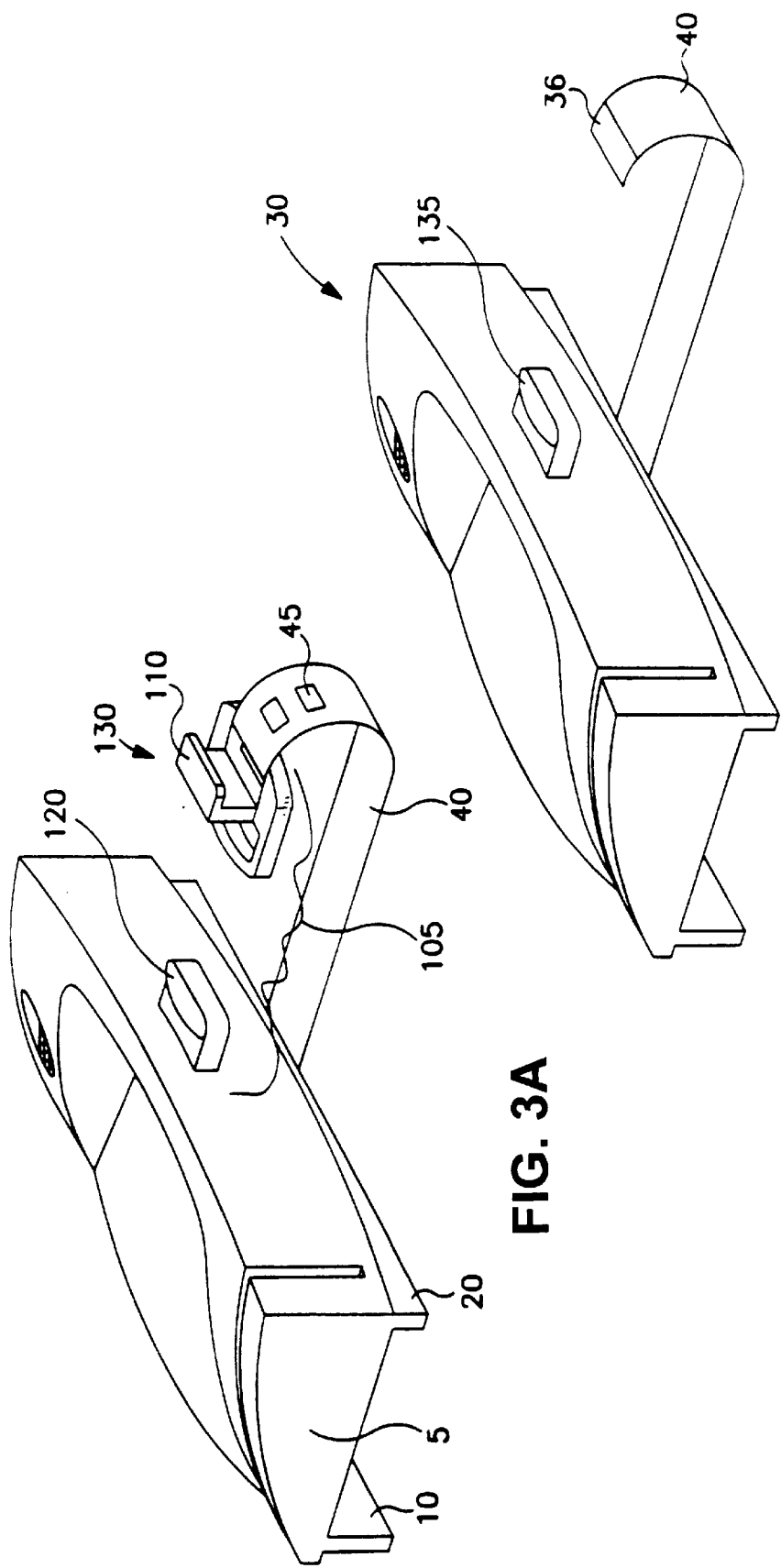

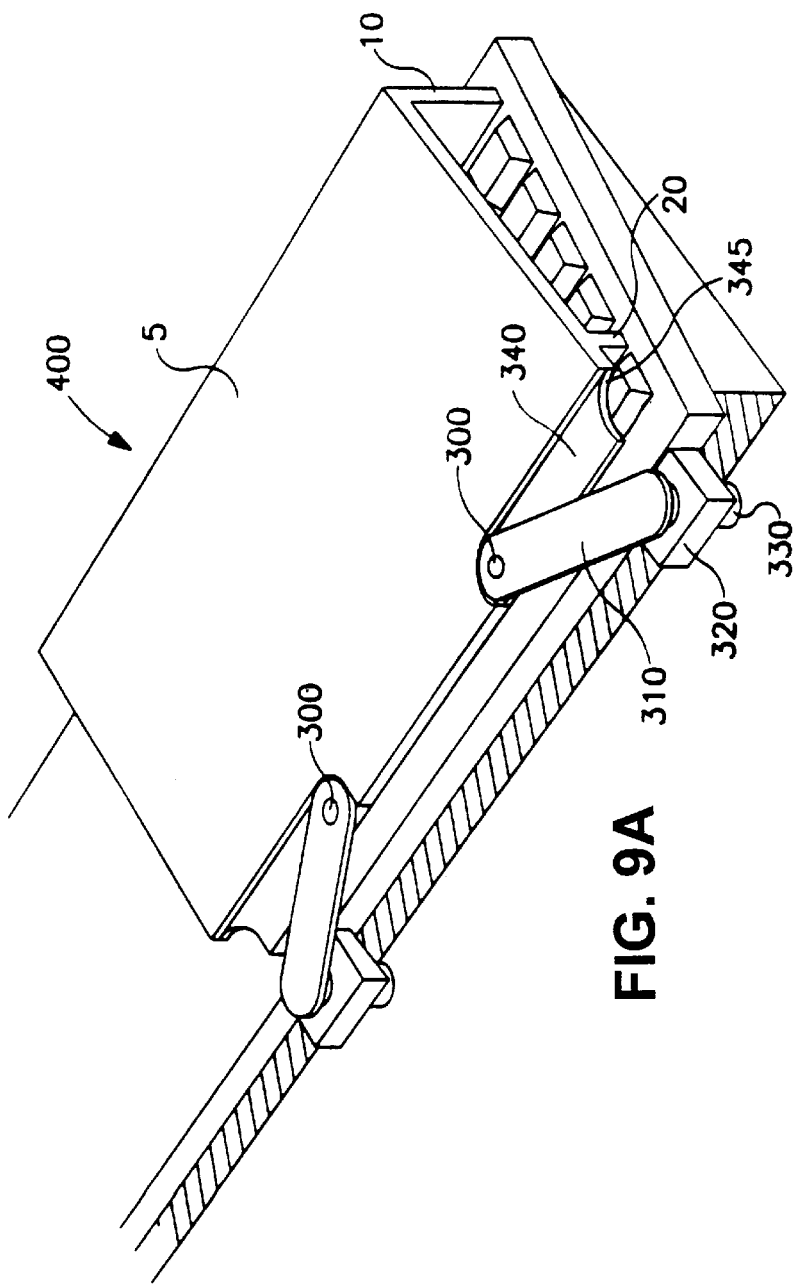
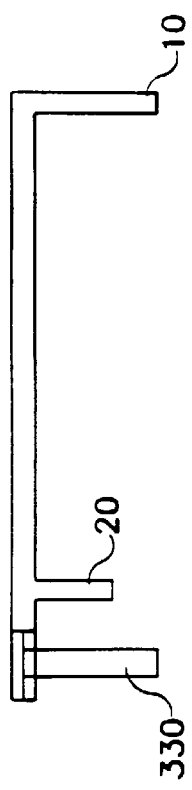
FIG. 9A
FIG. 9B

KEYBOARD INTERFACE

RELATED APPLICATION

This application is a continuation of U.S. application Ser. No. 09/019,489, filed Feb. 4, 1998 now U.S. Pat. No. 5,992,819, and titled "Keyboard Interface Device." This application also is a co-pending patent application of U.S. patent application Ser. No. 08/018,691 filed on Feb. 4, 1998, entitled "Mechanical Interface Device." The contents of U.S. patent application Ser. No. 09/018,691 filed on Feb. 4, 1998, entitled "Mechanical Interface Device" is hereby incorporated by reference.

FIELD OF THE INVENTION

This invention relates to the field of computer peripherals. More particularly, this invention relates to the field of removable keyboard interface devices, for allowing a user to removably couple the keyboard interface device to an underlying keyboard.

BACKGROUND OF THE INVENTION

In the past decade, the use of personal computers has grown at a tremendous pace. Since the introduction of the personal computer, there have been numerous inventions to help users input information and interface with their computers. The most common computer interface device is the standard "QRTY" keyboard. However, the standard "QRTY" keyboards may prevent people from using a computer if they have limited dexterity or who simply cannot type. There is a strong need for a computer interface device that can securely and removably attach to any underlying computer keyboard.

As a result, there have been numerous inventions attempts to overcome these inherent limitations of computer keyboards. For example, joysticks are disclosed in U.S. Pat. Nos. 5,034,574 and 4,945,357. These joysticks reside above the numeric keypad and attach to at least one of the numeric keys. However, these joysticks are not securely anchored onto the keyboard and can be accidentally dislocated if they are bumped.

Further, the U.S. Pat. No. 5,514,855 discloses a keyboard overlay which is designed to fit over a specific "QRTY" keyboard. However, this keyboard overlay is not securely attached to the keyboard and can inadvertently be removed from the underlying keyboard. Further, this keyboard overlay disclosed in the U.S. Pat. No. 5,514,855 patent does not teach being adaptable to non-standard computer keyboards such as curved "QRTY" keyboards.

What is needed is a keyboard interface device which securely yet removably couples to computer keyboards of varying sizes. What is further needed is a keyboard interface device that automatically aligns itself with respect to the underlying keyboard when the keyboard interface device and the underlying keyboard are coupled together.

SUMMARY OF THE INVENTION

The present invention is a keyboard interface device that can removably and conveniently attach to computer keyboards of varying sizes. This present invention is preferably user adjustable to accommodate keyboards with a wide variety of sizes and shapes. The keyboard interface device preferably provides means for attaching which is configured to securely attach the interface device with the underlying keyboard. Similarly, the means for attaching is also preferably configured to quickly release the underlying keyboard from the keyboard interface device in response to the user. For example, the means for attaching comprises: quick-release latch, hook/loop fabric, aperture/peg fastener, guiding fins, and the like. Further, the keyboard interface device is preferably configured to be automatically aligned with the underlying keyboard when the interface device is coupled to the underlying keyboard and provide the user with visual alignment confirmation.

It is an object of the present invention to provide a keyboard interface device which conveniently and removably attaches to an underlying keyboard. Additionally, another object of the present invention is to provide a keyboard interface device which adapts to underlying keyboards of varying sizes. Finally, another object of the present invention is to provide a keyboard interface device which automatically aligns with the underlying keyboard.

BRIEF DESCRIPTION OF THE DRAWINGS

FIG. 1A illustrates a front perspective view of the preferred embodiment of the present invention.

FIG. 1B illustrates a back perspective view of the preferred embodiment of the present invention.

FIG. 2A illustrates a front perspective view of a first alternate embodiment of the present invention.

FIG. 2B illustrates a back perspective view of the first alternate embodiment of the present invention.

FIG. 3A illustrates a detailed diagram of a first connecting means of the preferred embodiment.

FIG. 3B illustrates a detailed diagram of a second connecting means of the preferred embodiment.

FIG. 9A illustrates a front perspective view of a second alternate embodiment of the present invention.

FIG. 9 illustrates a side view of the alternate embodiment of the present invention.

DETAILED DESCRIPTION OF THE EMBODIMENTS OF THE PRESENT INVENTION

Figure 1C:
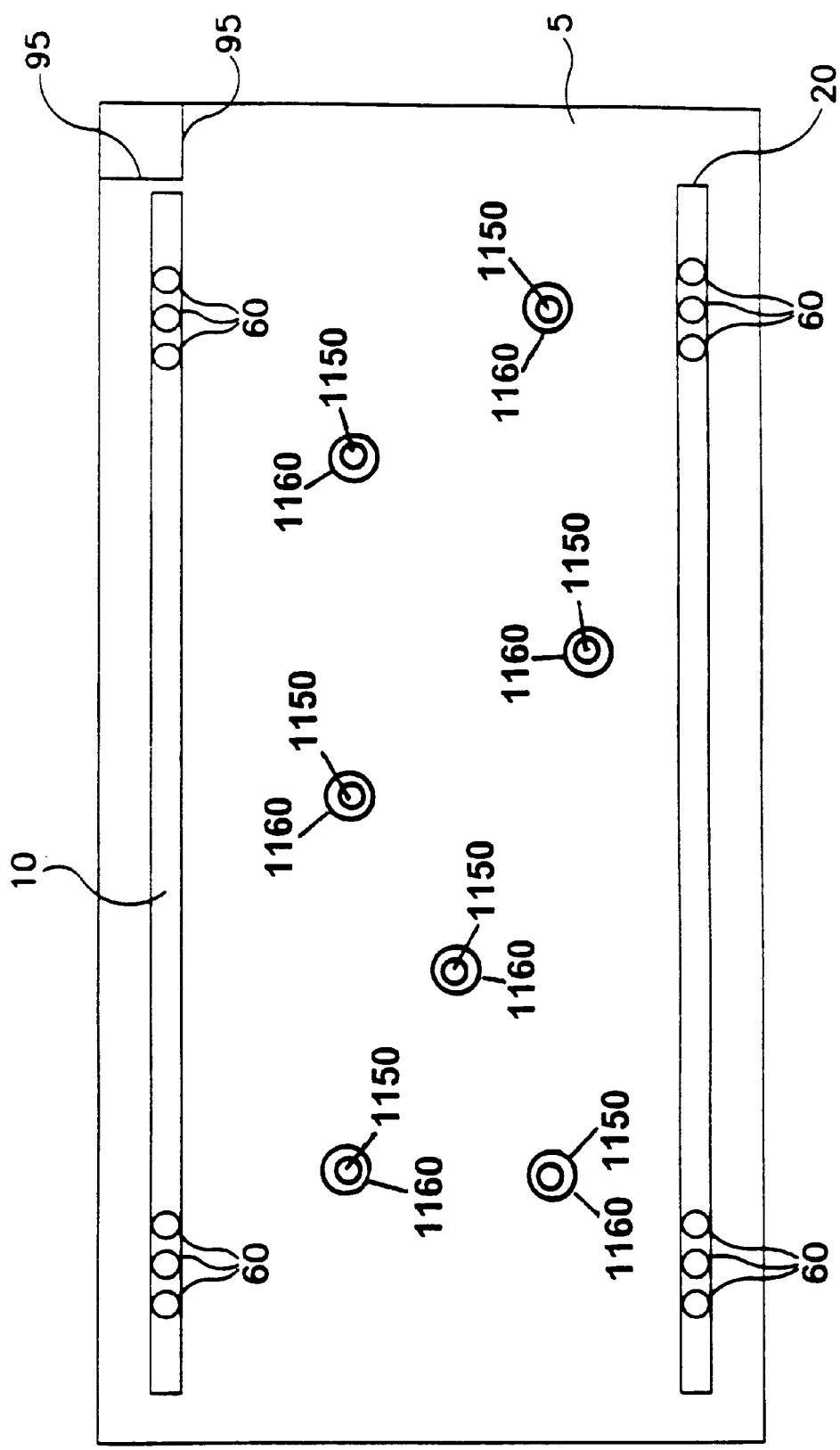
FIG. 1C illustrates a bottom view of the preferred embodiment of the present invention.

FIG. 1A shows a front perspective view of the preferred embodiment of an interface device 30. The interface device 30 is adapted to be removably coupled to an underlying keyboard (not shown). The underlying keyboard can comprise any plurality of contiguous keys. For example, in the present invention, the underlying keyboard can be in a standard "QRTY" configuration with a flat one-piece keyboard, a curved one-piece keyboard, or a two-piece keyboard. Additionally, the underlying keyboard comprises at least two keys which are adjacent to each other. A sample QRTY keyboard is shown in FIG. 1D.

Preferably, once the interface device 30 is securely coupled to the underlying keyboard, the interface device 30 can only be intentionally detached by the user from the underlying keyboard. It will be apparent to a person with ordinary skill in the art to apply the interface device 30 to various underlying keyboards which are not a standard "QRTY" keyboard.

The interface device 30 has a base 5 for providing structure to the interface device 30. Preferably, the base 5 is attached to a front standoff 10 and a back standoff 20. The back standoff 20 is considered the edge of the keyboard furthest from the user during normal use. In the case of a standard "QRTY" keyboard being the underlying keyboard, the front standoff 10 would preferably be adjacent to the space bar of the keyboard, and the back standoff 20 rests between the function keys and the number keys of the underlying keyboard. When the interface device 30 is coupled to the underlying keyboard, the front standoff 10 rests adjacent to the outer perimeter of the contiguous plurality of keys at the front of the underlying keyboard. Similarly, the back standoff 20 rests adjacent to the outer perimeter of the contiguous plurality of keys at the back of the underlying keyboard. While the interface device 30 is coupled to the underlying keyboard, the height of the front standoff 10 and the back standoff 20 are preferably configured such that the base 5 remains approximately level. Preferably, a plurality of rubber feet 60 are attached to the bottom of the front standoff 10 and the bottom of the back standoff 20. The plurality of rubber feet 60 prevent the front standoff 10 and the back standoff 20 of the interface device from slipping relative to the underlying keyboard.

An additional support leg 25 protrudes downward from the base 5 in the same direction as the front standoff 10 and the back standoff 20 and is in close proximity to the back standoff 20. It is also preferable to have at least one of the plurality of rubber feet 60 attached to the bottom of the additional support leg 25 to prevent the support leg 25 from accidentally slipping while resting on a surface. While the interface device 30 is resting on a level surface and not coupled with an underlying keyboard, the interface device 30 is preferably configured to be supported by the front standoff 10 and the additional support leg 25 such that the base 5 remains approximately level. Further, the additional support leg 25 is configured to be folded and stored within the base 5 when the support leg 25 is not in use. The support leg 25 as seen in FIGS. 1A and 1B illustrate the support leg 25 in an extended position.

A block 50 illustrates a method for attaching a strap 40 to the base 5 in close proximity to the front standoff 10. This method for attaching, represented in block 50, may take many different forms and will be described in greater detail below and illustrated in subsequent drawings. For example, the method for attaching the strap 40 to the base 5 at block 50 can be accomplished via a permanent mount, a hook/loop fastener, a quick-release fastener, or an aperture/peg fastener.

When the interface device 30 is coupled to the underlying keyboard, the strap 40 is preferably in contact with and surrounding portions of the underlying keyboard. Preferably, the strap 40 is a flexible material such that the strap 40 conforms to the specific shape of a particular underlying keyboard. The length of the strap 40 can be either be stretchable or rigid. A stretchable strap 40 does not require the strap 40 to have an adjustable length because the stretchable strap 40 can automatically adjust to different sizes of underlying keyboards. On the other hand, if the strap 40 is not stretchable, then the strap 40 will preferably provide a means to adjust the length in order to compensate for underlying keyboards of varying sizes.

FIG. 1B illustrates a back perspective view of the preferred embodiment of the present invention. A block 70 illustrates a method for attaching the strap 40 to the base 5 in close proximity to the back standoff 20. Similar to the block 50, this method for attaching represented in block 70 can take many different forms and will be described in greater detail below and illustrated in subsequent drawings. Just as in block 50, block 70 can be accomplished via a permanent mount, a hook/loop brand fastener, a quick-release fastener, or an aperture/peg fastener.

Further, an aperture 80 is preferably located through the base 5 to allow a user to see one of the plurality of keys on the underlying keyboard. This aperture 80 aids the user in properly aligning the interface device 30 relative to the coupled underlying keyboard.

Figure 1D:
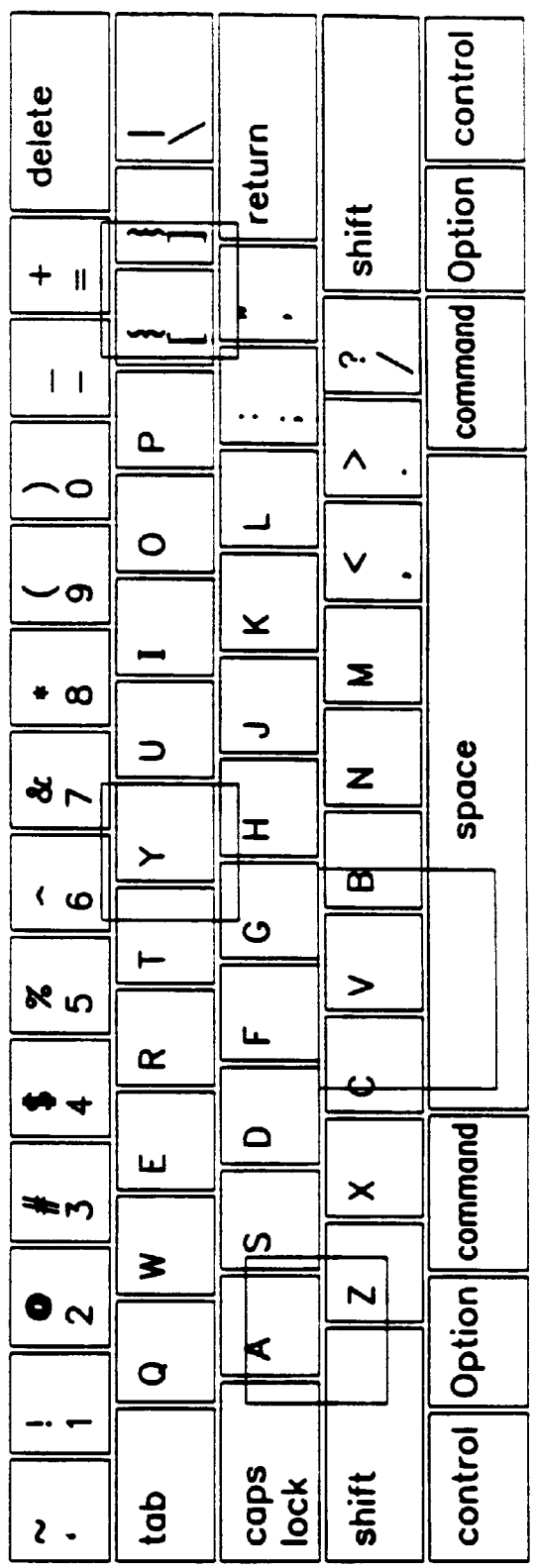
FIG. 1D illustrates a sample QRTY keyboard.

FIG. 1C illustrates the bottom view of the preferred embodiment of the present invention. The preferred embodiment also utilizes a plurality of alignment guide fins 95 coupled to the base 5. The plurality of alignment guide fins 95 guide the interface device 30 in correct alignment with respect to the underlying keyboard as the interface device 30 is securely coupled to this underlying keyboard. Correct alignment between the underlying keyboard and the interface device 30 is desired for proper operation of the interface device 30.

When the interface device 30 is engaged with an underlying keyboard, the interface device 30 is preferably configured to remain coupled with the underlying keyboard even if the strap 40 is not utilized. When coupled with the underlying keyboard, the front standoff 10 is configured to prevent the interface device 30 from sliding away from the user and off the underlying keyboard in normal use. Similarly, the back standoff 20 is configured to prevent the interface device 30 from sliding toward the user and away from the underlying keyboard in normal use. Additionally, the plurality of guiding fins 95 is configured to prevent the interface device 30 from sliding side to side with respect to the underlying keyboard in normal use. As a result of the front standoff 10, the back standoff 20, and the plurality of guiding fins 95, the interface device 30 is capable of remaining coupled with the underlying keyboard without the use of the strap 40.

FIG. 2A shows a front perspective view of alternate embodiment of an interface device 500. The interface device 500 is adapted to be removably coupled to an underlying keyboard (not shown). The underlying keyboard can comprise any plurality of contiguous keys. For example, in the present invention, the underlying keyboard can be in a standard "QRTY" configuration with a flat one-piece keyboard, a curved one-piece keyboard, or a two-piece keyboard. Additionally, the underlying keyboard comprises at least two keys which are adjacent to each other.

Preferably, once the interface device 500 is securely coupled to the underlying keyboard, the interface device 500 can only be intentionally detached by the user from the underlying keyboard. It will be apparent to a person with ordinary skill in the art to apply the interface device 500 to various underlying keyboards which are not a standard "QRTY" keyboard.

The interface device 500 is preferably coupled to a front standoff 510 and a back standoff 520. The back standoff 520 is considered the edge of the keyboard furthest from the user during normal use. In the case of a standard "QRTY" keyboard being the underlying keyboard, the front standoff 510 would preferably be adjacent to the space bar of the keyboard, and the back standoff 520 rests between the function keys and the number keys of the underlying keyboard. When the interface device 500 is coupled to the underlying keyboard, the front standoff 510 rests adjacent to the outer perimeter of the contiguous plurality of keys at the front of the underlying keyboard. Similarly, the back standoff 520 rests adjacent to the outer perimeter of the contiguous plurality of keys at the back of the underlying keyboard.

The interface device 500 also has the ability to independently adjust the height of the front standoff 510 and the back standoff 520. A front pair of height adjustment assemblies 530 are coupled to the front standoff 510. A back pair of height adjustment assemblies 540 are coupled to the back standoff 520. The front and back pairs of height adjustment assemblies (530 and 540) preferably support the front standoff 510 and the back standoff 520, respectively. Additionally, when the interface device 500 is coupled to the underlying keyboard, the front and back pairs of height adjustment assemblies (530 and 540) contact the underlying keyboard. The front pair of height adjustment assemblies 530 are configured to adjust the distance between the front standoff 510 and the underlying keyboard. Likewise, the back pair of height adjustment assemblies 540 are configured to adjust the distance between the back standoff 520 and the underlying keyboard. This allows the height of the front standoff 510 and the back standoff 520 to independently adjust such that the interface device 500 is configured to remain level independent of the shape of the underlying keyboard. By adjusting the height adjusting assemblies (530 and 540), the bottom stroke of an element from the interface device 500 can be made coincident with a full stroke of the keys of the underlying keyboard. This will allow the keys to be appropriately toggled while preventing damage thereto.

Further, an aperture 590 is preferably located through a base 570 to allow a user to see one of the plurality of keys on the underlying keyboard. This aperture 590 aids the user in properly aligning the interface device 500 relative to the coupled underlying keyboard.

Figure 2C:
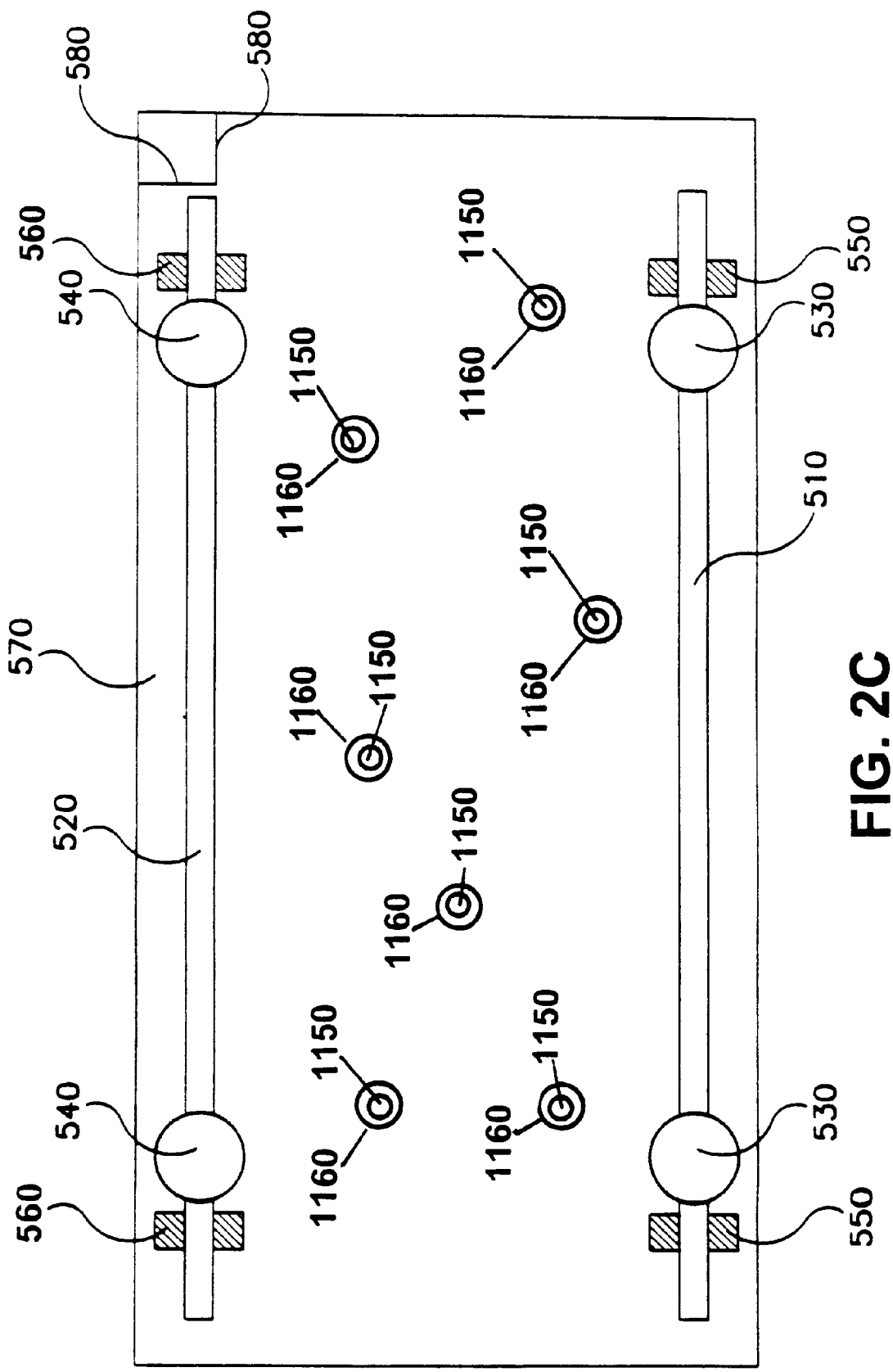
FIG. 2C illustrates a bottom view of the first alternate embodiment of the present invention.

FIG. 2C illustrates the bottom view of the preferred embodiment of the present invention. A pair of tracks 550 is embedded into the base 570 of the interface device 500. Preferably, the front standoff 510 is securely anchored to the pair of tracks 550 such that the front standoff 510 can selectively slide toward or away from the back standoff 520. Similarly, a pair of tracks 560 is preferably also embedded into the base 570 of the interface device 500 wherein the back standoff 520 can selectively slide toward or away from the front standoff 510. By being able to adjust the positions of the front standoff 510 and back standoff 520, the interface device 500 can accommodate a wider size range of underlying keyboards. It would be apparent to a person with ordinary skill in the art to construct a single track instead of a pair of tracks for the front standoff 510 or the back standoff 520. Further, it would be within the scope and spirit of the preferred embodiment of the present invention to construct a single long track which would span the width of the base 570 to anchor both the front standoff 510 and the back standoff 520 on this same single track.

Further, like the preferred embodiment, FIG. 2C utilizes a plurality of alignment guide fins 580 coupled to the base 570. The plurality of alignment guide fins 580 guide the interface device 500 in correct alignment with respect to the underlying keyboard. Correct alignment between the underlying keyboard and the interface device 30 is desired for proper operation of the interface device 500. Further, the plurality of alignment guide fins 580 also ensures that the interface device 500 does not laterally shift side to side with respect to the underlying keyboard.

FIG. 3A shows a detailed illustration of a quick-release fastener 105 as described in blocks 50 and 70 (FIGS. 1A and 1B) in the preferred embodiment. A male portion 120 of the connector 105 is preferably permanently attached to a side of the base 5. Hence, the female portion 110 is coupled to the strap 40. The male portion 120 of the connector 105 is configured to be releasably connected to the corresponding female portion 110. A release button 130 is integrally formed within the female portion 110 for quickly detaching from the male portion 120. Once the female portion 110 and the male portion 120 are connected, they can only be disconnected by a user intentionally depressing the release button 130. The connector 105 along with the corresponding female portion 110 and the male portion 120 can be utilized as the method for attaching as represented in the blocks 50 and/or 70 in FIGS. 1A and 1B, respectively. The interface device 30 could have the connector at both the front and back of the interface device 30 or preferably just one place.

Additionally, FIG. 3B illustrates another embodiment of a quick release fastener by utilizing a hook/loop fastener. A top portion 36 of the strap 40 is preferably made of either the hook or loop fastener fabric. Preferably, a receiving portion 135 is coupled to the side of the base 5. This receiving portion 135 is either the hook or loop fastener fabric configured to engage the top portion 36 of the strap 40. Preferably, once the receiving portion 135 and the top portion of the strap 40 are coupled together, they may be purposely detached by the user.

Figure 4:
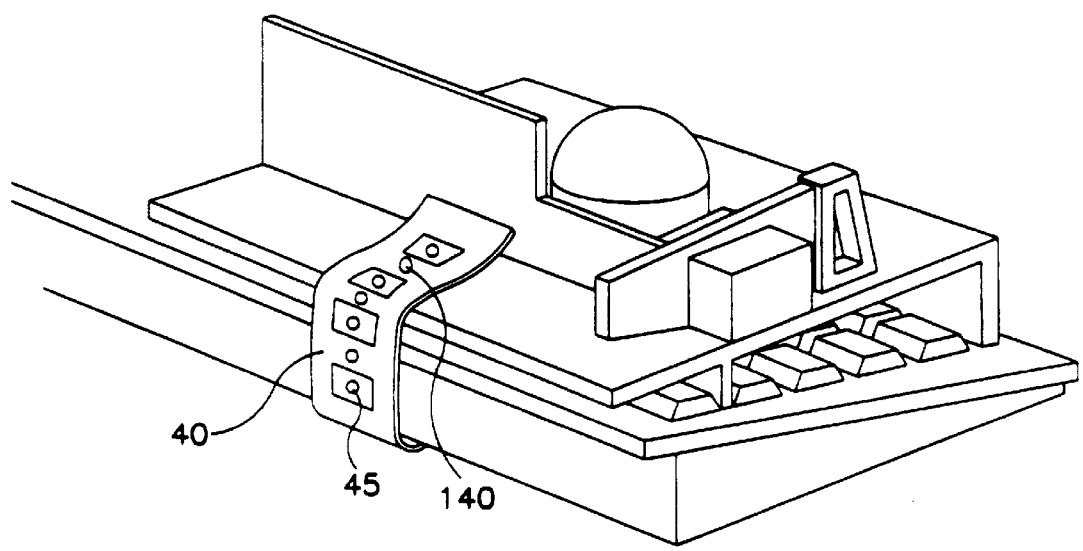
FIG. 4 illustrates a detailed diagram of a third connecting means of the preferred embodiment.

FIG. 4 shows a detailed illustration of the peg/aperture attaching device as described as blocks 50 and 70 in the preferred embodiment. The strap 40 preferably has at least one aperture 45. Preferably, a peg 140 protrudes from the top surface of the base 5. Further, it is also preferable that the aperture 45 of the strap 40 fits through the peg 140. In use, the user may attach the strap 40 to the base 5 by slipping the aperture 45 towards the base 5 and through the peg 140. The user can release the connected strap 40 from the base 5 by pulling the strap 40 away from the base 5 such that the aperture 45 is drawn away from the base 5 and becomes free from the peg 140. The peg/aperture attaching device may be utilized as the method for attaching the interface apparatus to the underlying keyboard as represented in blocks 50 and 70 in FIGS. 1A and 1B, respectively.

Figure 5A:
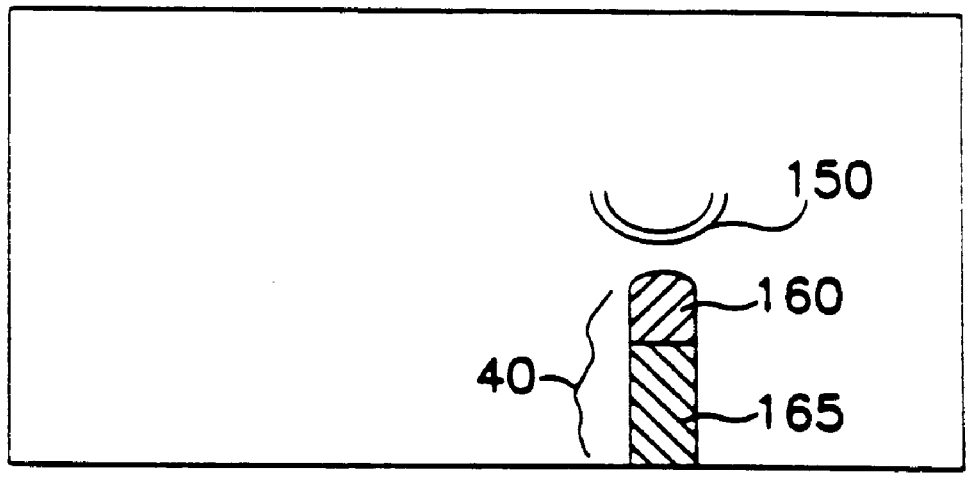
FIG. 5A illustrates a detailed diagram of a fourth connecting means of the preferred embodiment.

FIG. 5A illustrates a detailed drawing of the hook/loop fastener device as described in blocks 50 and 70 in the preferred embodiment. The strap 40 preferably has a hook fastener type of fabric on an end portion 160 of the strap 40 and a loop fastener type of fabric a remaining portion 165 of the strap 40. The hook fastener portion 160 is configured to engage the loop fastener portion 165 such that once pressed together, the connected hook 160 and loop fastener 165 is capable of withstanding lateral forces. Preferably, a loop 150 is attached to the base 5. The loop 150 should preferably be large enough to allow the strap 40 to pass through the loop 150.

Figure 5B:
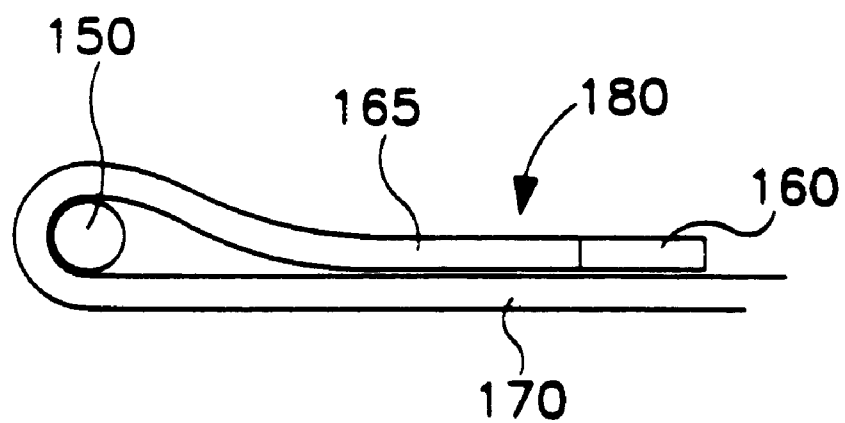
FIG. 5B illustrates a side view of the fourth connecting means of the preferred embodiment as shown in FIG. 5A.

FIG. 5B shows a side view of the strap 40 attached to the base 5 utilizing the hook/loop fastener. In use, to attach the strap 40 to the base 5, a free end 180 of the strap 40 is first guided through the loop 150. Next, to complete the fastening, the free end 180 of the strap 40 is pressed against a portion 170 of the strap 40 such that the hook fastener fabric 160 on the free end 180 of the strap connects to the portion 170 with the loop fastener portion 165. To disconnect the connected strap 40, the user will preferably be required to deliberately pull the free end 180 of the strap away from the portion 170. It would be obvious to a person skilled in the art to substitute the hook fastener fabric with the loop fastener fabric and likewise substitute the loop fastener fabric with the hook fastener fabric.

Figure 6:
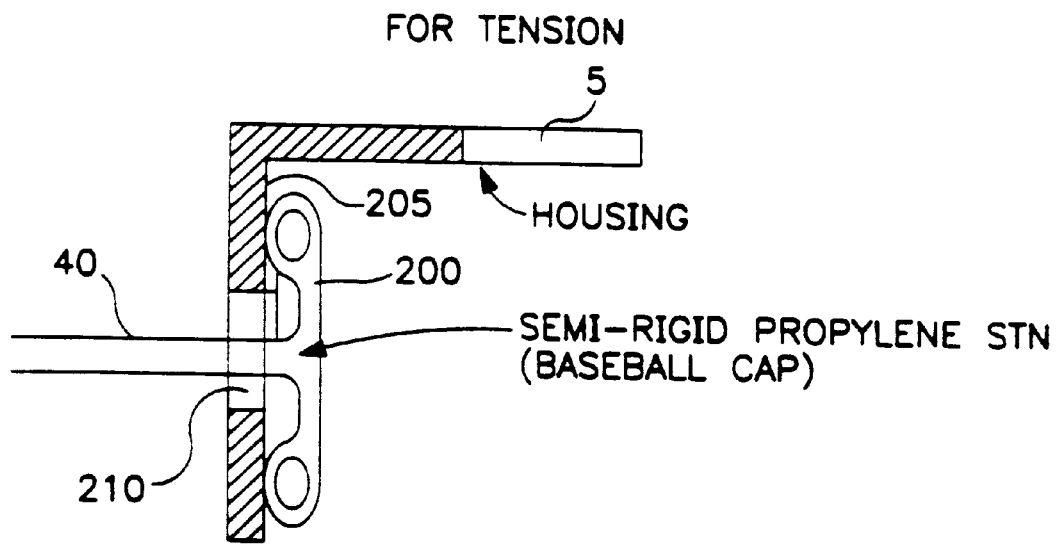
FIG. 6 illustrates a detailed diagram of a fifth connecting means of the preferred embodiment.

FIG. 6 illustrates a detailed drawing of a permanent method to attach the strap 40 to the base 5 as described in blocks 50 and 70 shown in FIGS. 1A and 1B of the preferred embodiment. An opening 210 is located in the base 5 at where attachment of the strap 40 to the base 5 is desired. Preferably, a semi-rigid propylene connector 200 is attached to the end of the strap 40 and is housed inside the base 5. When the strap 40 is in use and under tension, the propylene connector 200 contacts an interior wall 205 of the base 5. The opening 210 is sized to allow the strap 40 to pass through while also preventing the propylene connector 200 from exiting the base 5. The propylene connector 200 is preferably flexible enough to allow the strap 40 to stretch even if the strap itself 40 is not made from a stretchable material. However, the propylene connector 200 is also rigid enough to prevent the propylene connector 200 from collapsing such that the connector 200 exits the base 5 through the opening 210.

Figure 7:
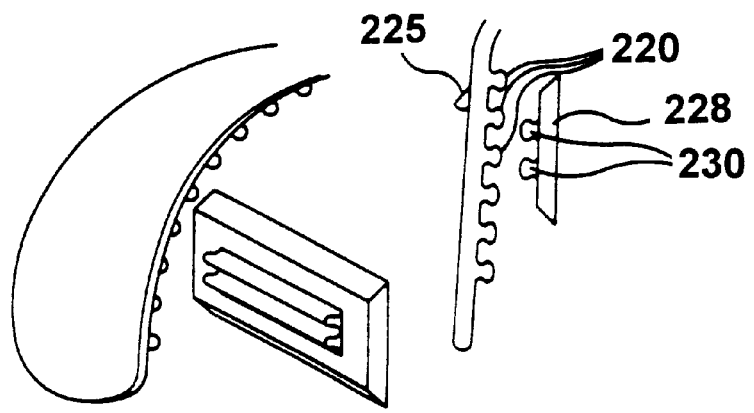
FIG. 7 illustrates a detailed diagram of a sixth connecting means of the preferred embodiment.

FIG. 7 shows a detailed drawing of a releasable connector to attach the strap 40 to the base 5 as described in the preferred embodiment in blocks 50 and 70 shown in FIGS. 1A and 1B. FIG. 7 shows a releasable connector with a coupling connector 225 that preferably attaches to the end of the strap 40. The coupling connector 225 has a plurality of interlocking raised teeth 220 on one side. A coupling base 228 is preferably mounted onto the base 5 in a desired location where the strap 40 connects to the base 5. Preferably, there are at least two interlocking raised receptors 230 mounted onto the surface of the coupling base 228 which are configured to receive at least one of the plurality of interlocking raised teeth 220 on the coupling connector 225 when the coupling base 228 is securely mounted onto the base 5. Preferably, the user locks the raised teeth 220 into the corresponding raised receptors 230 to effectively connect the strap 40 to the base 5.

Figure 8:
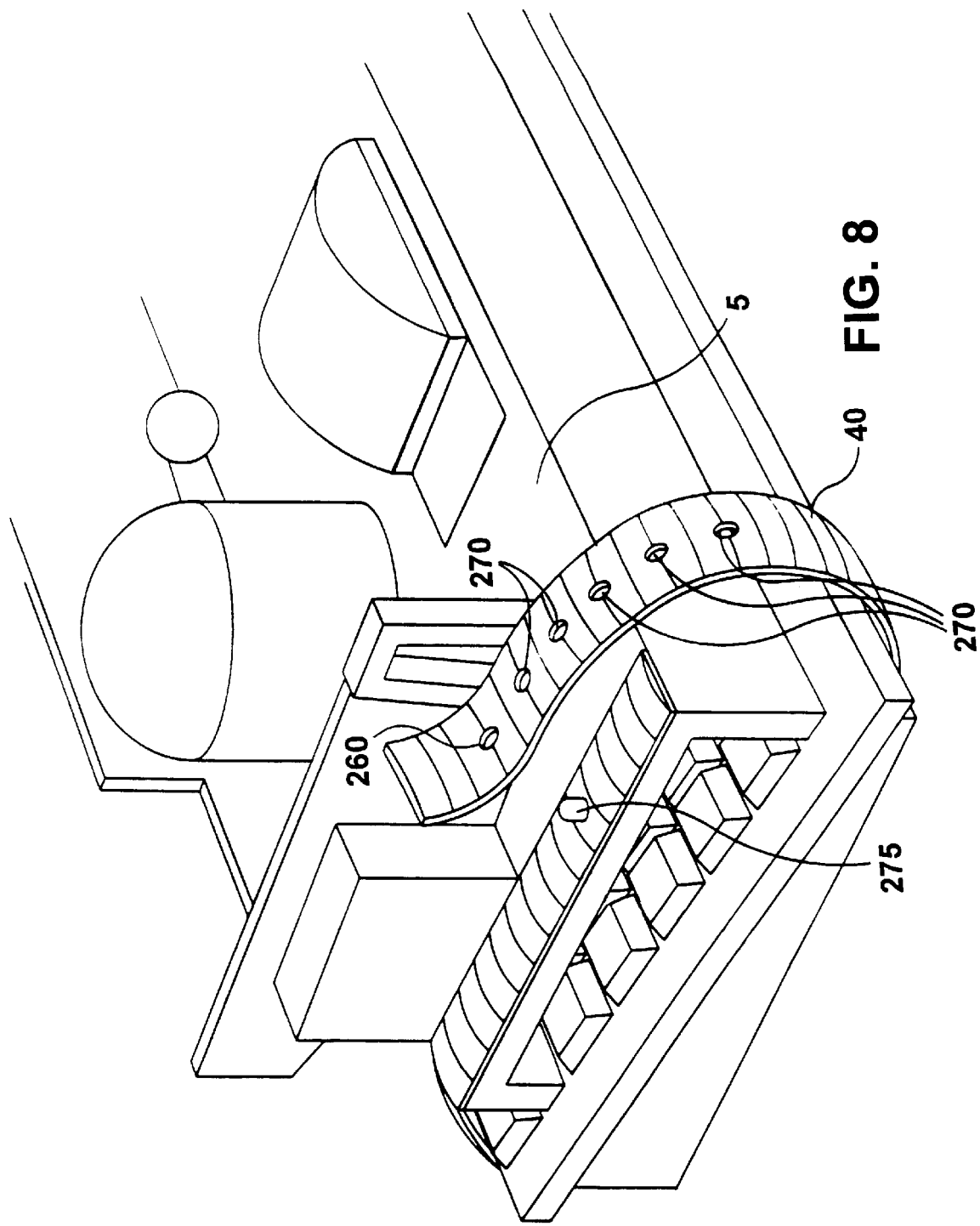
FIG. 8 illustrates a detailed diagram of seventh connecting means of the preferred embodiment.

FIG. 8 illustrates a connecting device similar to the peg/aperture attaching device as described above and illustrated in FIG. 3. However, this connecting device shown in FIG. 8 is preferably utilized as both blocks 50 and 70 at the same location for connecting the interface apparatus 30 to the underlying keyboard. The strap 40 preferably includes at least two apertures. A first aperture 250 should be located on the proximate end of the strap 40 and a second aperture 260 should be located on the distal end of the strap 40 such that there is enough distance between the apertures 250 and 260 for the strap 40 to completely wrap around the attached base 5 and underlying keyboard. Preferably, there are additional apertures 270 to allow the interface apparatus to connect with underlying keyboards of varying sizes. A peg 275 extends through the apertures 250, 260 to secure the strap.

FIG. 9A illustrates an interface device 400 as an alternate embodiment of the present invention. For the sake of clarity and simplicity, common elements of FIGS. 1A, 1B, 9A, and 9B share the same reference numbers. For example, the base 5, the front standoff 10, and the back standoff 20 are common to FIGS. 1A, 1B, 9A, and 9B and accordingly, share the same reference numbers. However, the interface device 400 also preferably includes a recess 340 and a void 345 in the base 5. Preferably, a first end of a member 310 is coupled to the base 5 within the recess 340 via a hinge connector 300 such that the member 310 preferably rotates about the hinge connector 300. Further, the member 310 preferably rotates in parallel with the top surface of the base 5 and is configured to be stored within the recess 340 when a side of the member 310 is rotated against the base 5. Preferably, a pin 330 is rotatably coupled to a second end of the member 310 such that the pin 330 can rotate about its axis. Further, a flange 320 preferably protrudes from a side of the pin 330 such that when the pin 330 rotates, the flange 320 rotates as well.

In use, the void 345 is configured such that when the member 310 is capable of rotating entirely within the area of the recess 340, the pin 330 is received within the void 345, thus forming a closed position. Further, when the apparatus 400 is in this closed position, the flange 320 preferably engages the base 5 by sandwiching the base 5 between the flange 320, the pin 330, and the member 310, thus locking the apparatus 400 in this closed position. While the interface apparatus 400 is locked in this closed position, the apparatus 400 may be either compactly stored or used in a free-free standing mode without the underlying keyboard.

FIG. 9B shows a side view of the alternate embodiment of the present invention in the closed position in the free-standing mode. As can be seen, in FIG. 9B, the apparatus 400 can stand level on its own by being supported by the front standoff 10 and the pin 330.

In FIG. 9A, the member 310, the pin 330, and the flange 320 are shown connecting the apparatus 400 to the underlying keyboard. The member 310 is shown rotated outward from the recess 340 and the pin 330 is outside the void 345. When the apparatus is connected to the underlying keyboard, the flange 320 is engaged with a portion of the underlying keyboard. The position of the flange 320 relative to the underlying keyboard is defined by the position of the member 310 and the pin 330. With the flange 320 engaged with the underlying keyboard, the apparatus 400 is preferably connected to the underlying keyboard.

Figure 10:
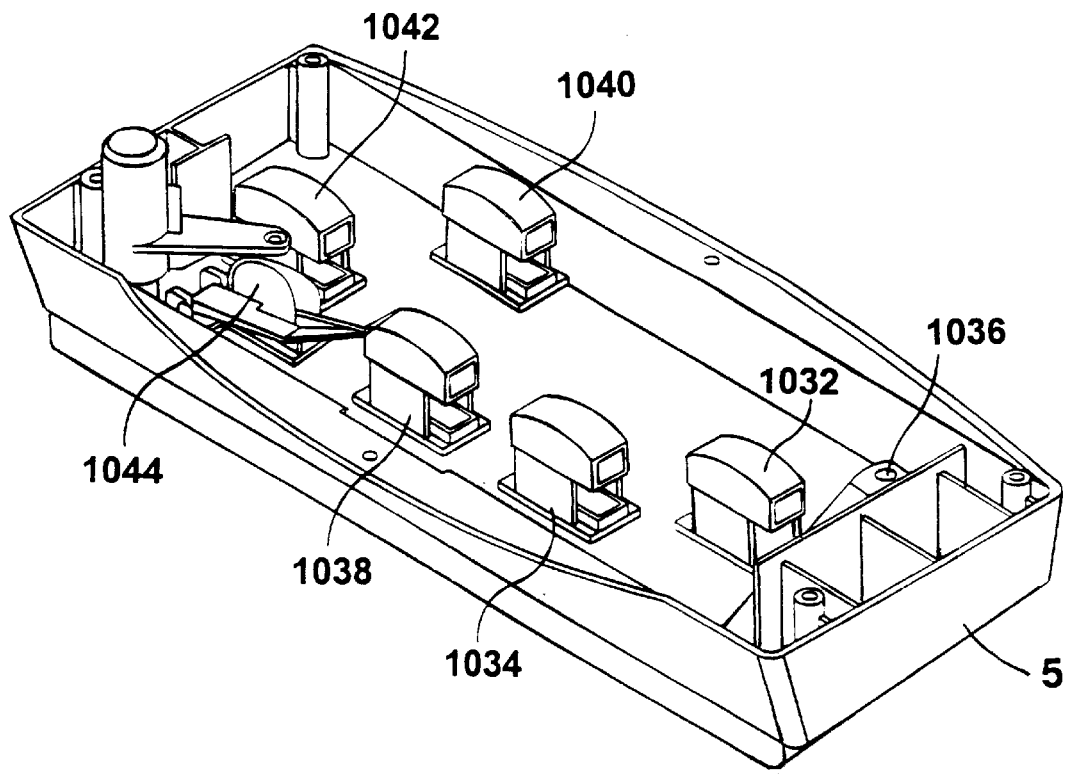
FIG. 10 is a cutaway view of a base of an interface device.

Each of the interface devices described above may include one or more key-contacting mechanisms that press a key of the keyboard in response to actuation of a mechanism on the interface device. FIG. 10 illustrates a cutaway view of a base 5 of an interface device 30 such that internal components of the base 5 are revealed. The base includes several depressing mechanisms that are coupled to actuation mechanisms on the interface device. For example, a depressing mechanism 1032 corresponds to a first actuation mechanism, a depressing mechanism 1034 corresponds to a second actuation mechanism, a depressing mechanism 1036 corresponds to a third actuation mechanism, a depressing mechanism 1044 corresponds to a fourth actuation mechanism, a depressing mechanism 1040 corresponds to a fifth actuation mechanism, a depressing mechanism 1042 corresponds to a sixth actuation mechanism, and a depressing mechanism 1046 corresponds to a seventh actuation mechanism. In general, each of these underlying depressing mechanisms is located below its respective actuation mechanism and above the underlying keyboard. In other words, each depressing mechanism may act as a connector between each actuation mechanism and the corresponding key of the underlying keyboard.

Figure 11:
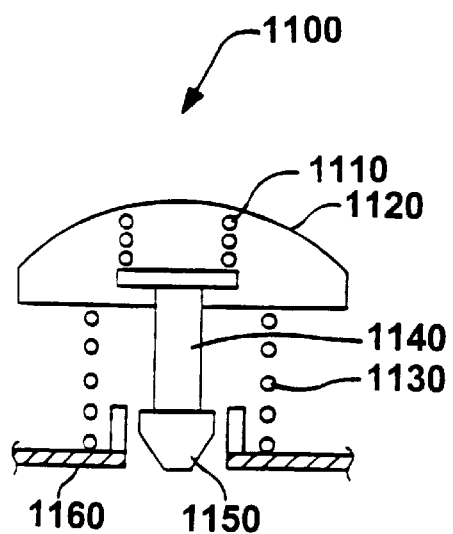
FIG. 11 is a schematic side view of a spring assembly of the interface device of FIG. 10.

FIG. 11 illustrates a detailed drawing of a spring assembly 1100 that may be used in the depressing mechanisms 1032, 1034, 1036, 1038, 1040, 1042 and 1044. The spring assembly 1100 includes a secondary spring 1110, a contact 1120, a primary spring 1130, an actuator 1140, and a PVC portion 1150. The PVC portion 1150 forms a portion of the actuator 1140 which extends through a hole 1160 in the base to press a particular key of the underlying keyboard.

Figure 12:
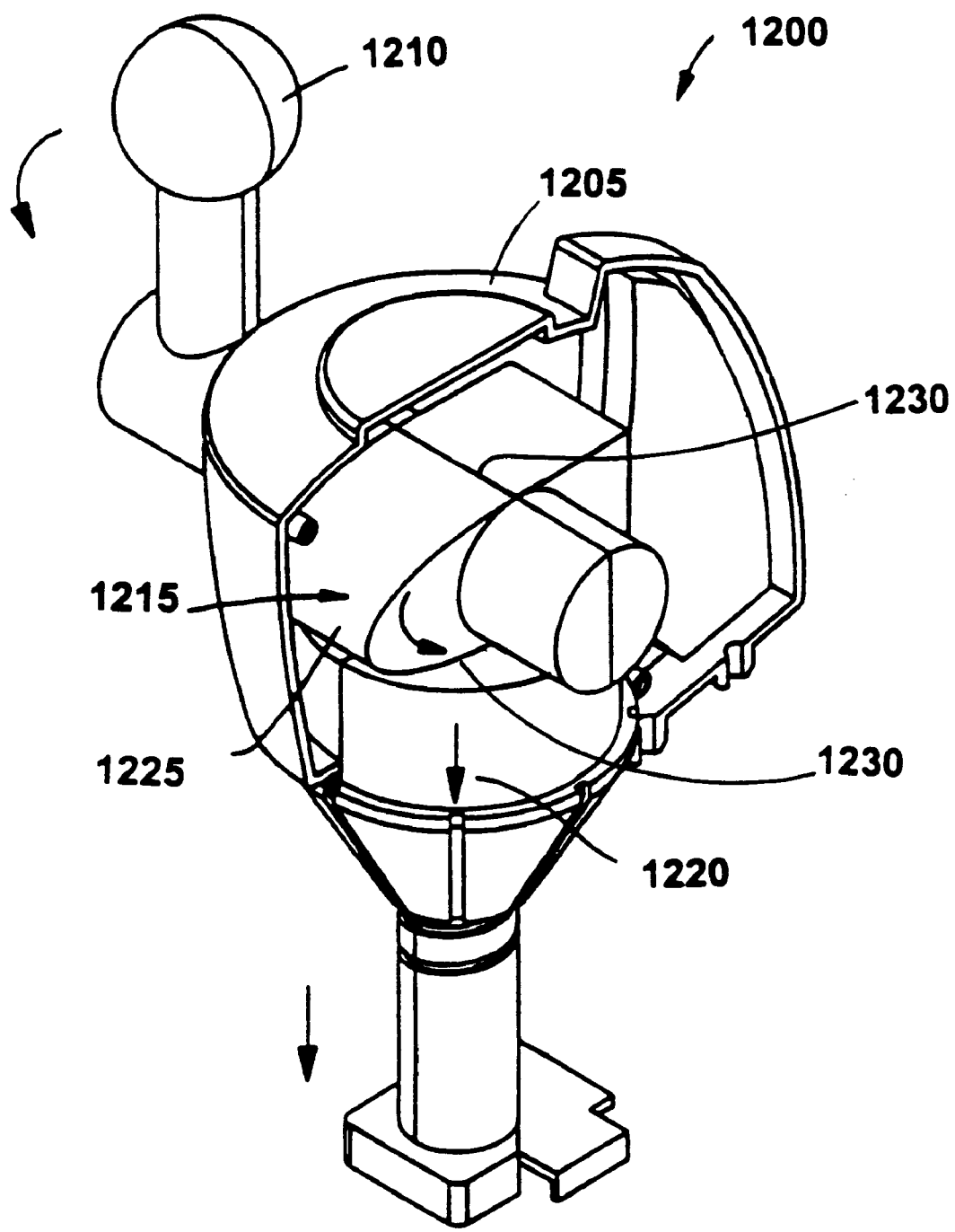
FIG. 12 is a cutaway perspective view of an actuation mechanism.

FIG. 12 illustrates a detailed cutaway view of an actuation mechanism including a three-dimensional representational object in the form of a drill 1200. The drill 1200 has a drill housing 1205 which is coupled to the interface device 30. A handle 1210 is rotatably coupled to the drill housing 1205 such that the user may rotate a first end of the handle 1210 relative to the drill housing 1205. A cam 1215 is attached to a second end of the handle 1210. Further, a first end of a vertical connector 1220 preferably contacts the cam 1215, and a second end of the vertical connector 1220 preferably contacts the depressing mechanism 1042 (FIG. 10). The cam 1215 contacts the vertical connector 1220 at two different positions: an "on" position 1225 and an "off" position 1230. When the cam 1215 contacts the vertical connector 1220 at the "on" position 1225, the vertical connector 1220 moves downward and depresses the depressing mechanism 1042 such that the particular key of the underlying keyboard related to the drill 1200 is depressed. When the cam 1215 contacts the vertical connector 1220 at the "off" position 1230, the vertical connector 1220 preferably does not depress the depressing mechanism 1042.

In use, when the cam 1215 contacts the vertical connector 1220 at the "off" position 1230, the vertical connector 1220 does not depress the depressing mechanism 1042. As a result, the depressing mechanism 1042 is also not depressing the particular key related to the drill 1200. Further, while in the "off" position 1230, the depressing mechanism 1042 preferably urges the vertical connector 1220 towards the cam 1215 and prevents the particular key related to the drill 1200 from being depressed.

When the first end of the handle 1210 is turned by the user, the handle 1210 rotates relative to the drill housing 1205. As the handle 1210 rotates, the cam 1215 preferably rotates as well. When the handle 1210 is rotated by the user such that the cam 1215 contacts the vertical connector 1220 at the "on" position 1230, the vertical connector 1220 preferably moves downward and depresses the depressing mechanism 1042. When the depressing mechanism 1042 is depressed, the actuator preferably depresses the particular key related to the drill 1200.

In use, the contact 1120 receives an outside force from the user manipulating a particular actuation mechanism. When the outside force is sufficient to depress the corresponding underlying key, the primary spring 1130 compresses and lowers the actuator 1140. As a result, the PVC portion 1150 depresses the corresponding key of the underlying keyboard. The PVC portion 1150 is configured to securely grip the corresponding key of the underlying keyboard.

Additionally, the secondary spring 1110 is preferably coupled between the contact 1120 and the actuator 1140. When the PVC portion 1150 is depressing the underlying key, the secondary spring 1110 preferably prevents the PVC portion 1150 from transferring too much of the outside force to the underlying key and possibly damaging this underlying key. Preferably, the secondary spring 1110 absorbs this excess force directed to the underlying key from the PVC portion 1150 when this corresponding key is already fully depressed. When the underlying key is already fully depressed and there is additional outside force, the secondary spring 1110 preferably compresses to absorb this additional downward force thereby preventing the PVC portion 1150 from exerting additional downward force on the fully depressed, underlying key. The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the fastening means disclosed herein. It will be apparent that fastening means of one type, such as quick-release, hook/latch fabric, aperture/peg can be substituted for each other and so forth.

What is claimed is:

1. A computer input device, comprising:
   a keyboard including a top surface having a front edge and a back edge, a bottom surface positioned opposite the top surface, and a key array including keys extending from the top surface, the key array including letter keys and number keys; and
   an interface device mounted on the keyboard, the interface device including:
      a base positioned over the key array;
      support components coupled to the base and supported by the keyboard to position the base over the key array;
      a key-contacting mechanism extending from the base and in a fixed orientation relative to the support components; and
      a strap extending from a front of the base to a rear of the base and around the bottom surface of the keyboard to secure the interface device to the keyboard,
   wherein the interface device further comprises a three-dimensional representational object mounted on the base and coupled to the key-contacting mechanism and a guiding fin extending from the base to align the interface device relative to the keyboard.

2. The computer input device of claim 1, wherein the interface device is supported by resting on the keyboard between the front edge of the top surface and the rear edge of the top surface.

3. The computer input device of claim 1, wherein the guiding fin extends in a direction generally parallel to the front edge of the keyboard.

4. The computer input device of claim 1, wherein the guiding fin extends in a direction generally perpendicular to the front edge of the keyboard.

5. The computer input device of claim 1, wherein the base comprises a continuous surface on which the key-contacting mechanism is mounted.

6. The computer input device of claim 1, wherein the support components coupled to the base comprise:
   a front standoff having a keyboard-contacting portion resting on the top surface of the keyboard; and
   a back standoff having a keyboard-contacting portion spaced from the keyboard-contacting portion of the front standoff such that:

the key array is positioned between the keyboard-contacting portion of the front standoff and the keyboard-contacting portion of the back standoff so as to align the base in a predetermined front-to-back orientation relative to the key array, the keyboard-contacting portion of the front standoff and the keyboard-contacting portion of the back standoff are both supported by the top surface of the keyboard, the keyboard-contacting portion of the front standoff is closer to the front edge of the top surface than is the keyboard-contacting portion of the back standoff, and is spaced from the front edge of the top surface toward the back edge of the top surface, and the keyboard-contacting portion of the back standoff is closer to the back edge of the top surface than is the keyboard-contacting portion of the front standoff, and is spaced from the back edge of the top surface toward the front edge of the top surface.

7. The computer input device of claim 1, wherein the strap comprises a flexible strap having a first end coupled to the front of the interface device and a second end coupled to the back of the interface device.

8. The computer input device of claim 7, wherein the first end of the flexible strap is permanently attached to the interface device and the second end is removably attached to the interface device.

9. The computer input device of claim 8, wherein:

the flexible strap includes a releasable quick release connector comprising a first interconnecting portion attached to the interface device and a second interconnecting portion attached to the second end of the strap, and the first interconnecting portion releasably connects with the second interconnecting portion.

10. The computer input device of claim 8, wherein the second end of the flexible strap comprises a first material that releasably connects with a second material on a surface of the base.

11. The computer input device of claim 10, wherein the first material and the second material together define a hook/loop fastener.

12. The computer input device of claim 8, wherein:

the second end of the flexible strap comprises a releasable fastener including a first material coupled to the second end of the flexible strap and a second material coupled to a portion of the flexible strap, the first material releasably connects with the second material, the base includes a loop coupled to the base, and the first end of the strap fits through the loop and contacts the portion of the strap.

* * * * *